United States Patent
Povlsen et al.

[11] Patent Number: 6,041,063
[45] Date of Patent: Mar. 21, 2000

[54] HIGH AVAILABILITY, SCALEABLE BANDWIDTH, MULTIPORT ATM-EMULATED LAN INTERFACE

[75] Inventors: Lars Povlsen, Dragoer; Erling Skjoldborg, Lyngby; Tomasz Jerzy Goldman, Hellerup, all of Denmark

[73] Assignee: Olicom A/S, Denmark

[21] Appl. No.: 08/931,555

[22] Filed: Sep. 16, 1997

[51] Int. Cl.[7] .................. H04J 3/16; H04L 12/28
[52] U.S. Cl. .................. 370/465; 370/466; 370/401; 370/395
[58] Field of Search ................... 370/389, 392, 370/395, 401, 402, 403, 404, 405, 406, 465, 466

[56] References Cited

U.S. PATENT DOCUMENTS

| | | | |
|---|---|---|---|
| 5,581,552 | 12/1996 | Civanlar et al. | 370/396 |
| 5,732,071 | 3/1998 | Saito et al. | 370/255 |
| 5,805,805 | 9/1998 | Civanlar et al. | 709/220 |
| 5,812,552 | 9/1998 | Arora et al. | 370/401 |
| 5,835,481 | 11/1998 | Akyol et al. | 370/216 |
| 5,949,753 | 9/1999 | Alexander, Jr. et al. | 370/216 |
| 5,982,773 | 11/1999 | Nishimura et al. | 370/395 |
| 5,983,281 | 11/1999 | Ogle et al. | 709/249 |

*Primary Examiner*—Hassan Kizou
*Assistant Examiner*—Saba Tsegaye
*Attorney, Agent, or Firm*—Cesari and McKenna, LLP

[57] ABSTRACT

An interface through which a host may conduct LAN-emulated communications over an ATM network. In a preferred embodiment, the interface provides communication through multiple ATM ports, each of which is represented by a network interface card (NIC) and an associated emulated MAC entity which includes a LAN emulation client (LEC). Even though multiple LECs may be associated with a host, only a single, common MAC address is used to identify the host. The invention provides several additional advantages including the ability to distribute traffic or share loads across multiple LECs, the ability to scale the bandwidth provided to a particular host, and the ability to provide one or more levels of redundancy with respect to host-ATM network communications.

15 Claims, 6 Drawing Sheets

HIGH AVAILABILITY, SCALEABLE BANDWIDTH, MULTIPORT ATM-EMULATED LAN INTERFACE

BACKGROUND OF THE INVENTION

An asynchronous transfer mode (ATM) network is a connection-oriented network which is well suited for high speed, high volume data communications. An ATM network consists essentially of a plurality of computers (hosts) which are connected in communicating relationships by a plurality of ATM switches. To provide communication between one computer and another, one or more virtual channel connections are established between the computers via the switches. Information (data) to be transferred is reduced into standard size units or cells, transmitted via the virtual channel connections, and reassembled at the point of exit from the ATM network. As a result of the virtual channel connections and channel identification information which accompanies each transmitted cell, an ATM switch is not required to perform substantial work to determine through which one of its ports a particular cell should be retransmitted.

While ATM represents a superior solution in terms of efficient use of bandwidth and transmission speed, much of the world's existing data network infrastructure consists of hosts connected to local area networks (LANs) which operate in accordance with a "connectionless" protocol such as Ethernet or Token Ring. In a connectionless LAN, when two hosts are communicating with each other there is no logical communication path which exists for the duration of their communication. Instead, frames of information, each of which includes a source address which identifies the host from which the frame originated and a destination address which identifies the host for which the frame is intended, are transmitted over a shared medium at particular times, in accordance with the rules of the protocol. Each source or destination address, which is known as a media access control (MAC) address, is essentially a number which uniquely identifies a particular host served by the LAN.

As a frame traverses the LAN, it may encounter a bridge, router or other LAN interconnection devices which, upon receipt of the frame, must examine or analyze the addresses contained therein to determine whether that particular frame should be retransmitted and, if so, through which particular output port in order to reach the intended destination. As a result, a substantial amount of work must be frequently performed by such LAN interconnection devices, thus significantly reducing efficiency and transmission speed.

In order to enable the vast numbers of LAN-connected users to obtain the benefits of ATM technology, a communication technique known as LAN Emulation over ATM (LANE) was developed. LANE is a method of emulating a connectionless LAN segment over an ATM network. LANE supports communications between two hosts where both hosts are connected directly to an ATM network, where one host is connected directly to an ATM network and the other is connected by a LAN segment to an ATM-LAN bridge, or where the hosts are connected to different LAN segments and both segments are connected to an ATM network. As specified by LANE, a host runs a software process called a LAN Emulation Client (LEC) to effect LAN-emulated communications over the ATM network. However, LANE does not provide for the association of multiple LECs with a single host, redundancy against the failure of a LEC (or its associated network interface card), nor for a scaleable bandwidth interface between a host and the ATM network.

SUMMARY OF THE INVENTION

In brief summary, the present invention provides an interface through which a host may conduct LAN-emulated communications over an ATM network. In a preferred embodiment, the interface provides communication through multiple ATM ports, each of which is represented by a network interface card (NIC) and an associated emulated MAC entity which includes a LEC. Even though multiple LECs may be associated with the interface, it is preferable that a single, common MAC address be assigned to the host. The use of a single, common MAC address for the host permits communication between the ATM network and the host through any of the LECs. In addition, in the event of a failure of one of the LECs or its associated NIC, communications may be maintained through the still functioning LECs without affecting existing virtual channel connections and without causing LAN-connected peers of the host to see or respond to a change in the host's MAC address.

The invention provides several additional advantages including the ability to distribute traffic or share loads across multiple LECs, the ability to scale the bandwidth provided to a particular host, and the ability to provide one or more levels of redundancy with respect to host-ATM network communications. The invention may be implemented in any device, including LAN-to-ATM interconnecting devices such as routers and bridges, which connects to an ATM network and uses LANE as the MAC level protocol.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
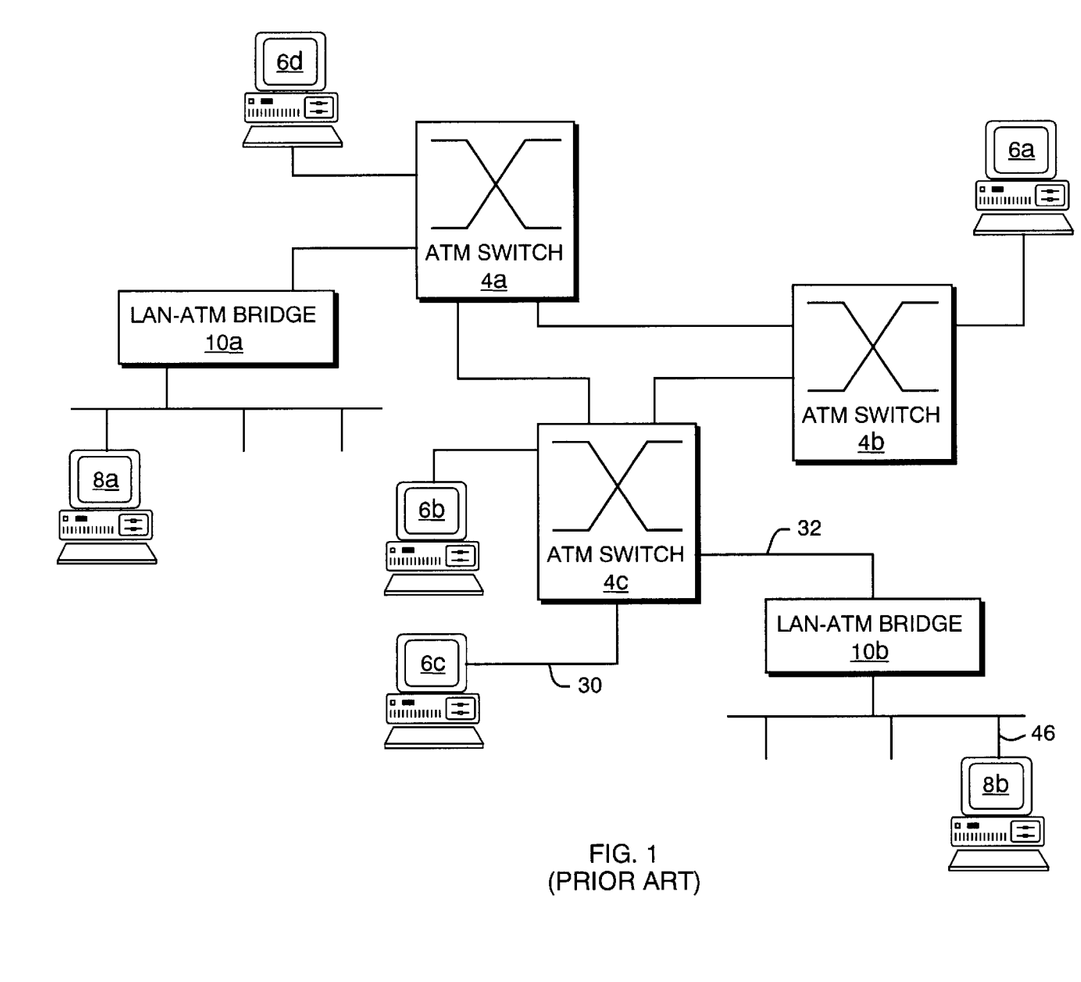
FIG. 1 is a block diagram of a network known in the prior art in which a central portion or backbone operates using ATM while other portions operate as LANs.

FIG. 1 shows a network 2 which includes three interconnected ATM switches 4a–4c which may represent a backbone. Hosts 6a–6d are connected directly to respective ones of the ATM switches. Hosts 8a and 8b are connected, respectively, by LAN segments to two LAN-ATM bridges 10a and 10b, each of which is also connected to one of the ATM switches. Each of hosts 6a–6d and 8a–8b may represent a personal computer (PC), workstation or other device having an appropriate network interface card (NIC).

Figure 2:
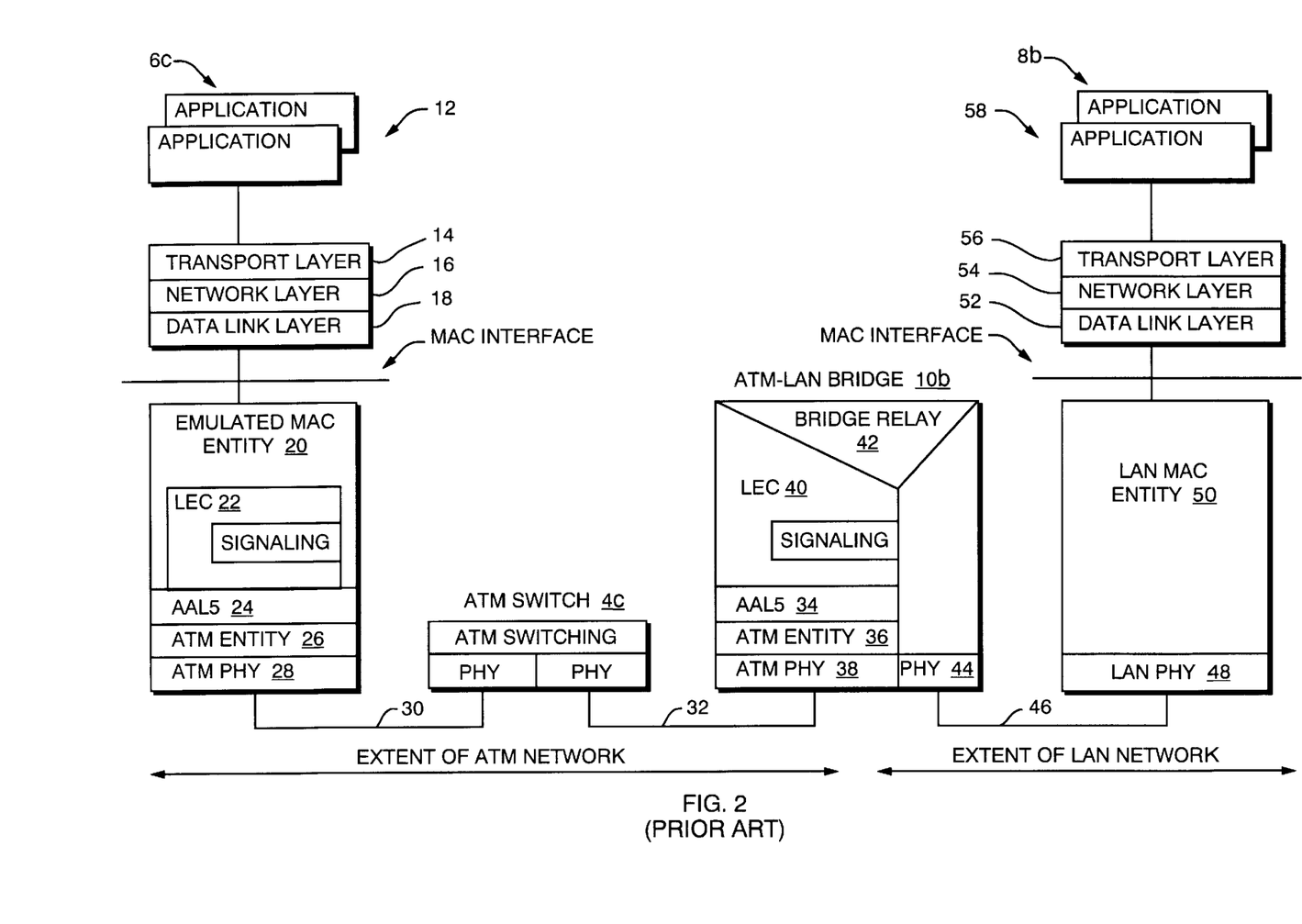
FIG. 2 is a software layer diagram of a portion of the network shown in FIG. 1.

With reference now to FIGS. 1 and 2, an example of how communications are effected between hosts served by network 2 is described. Assume that a user (not shown) or an application 12 running on host 6c wishes to communicate with a user (not shown) or an application 58 running on host 8b. Because host 6c is connected directly with ATM switch 4c, host 6c must operate in accordance with LANE in order to communicate with LAN-connected host 8b. Thus, beneath transport, network and data link layers 14, 16 and 18, respectively, an emulated MAC entity 20 which includes a LEC 22 is provided. LEC 22 communicates with ATM Adaptation Layer 5 (AAL5) which, in turn, communicates via ATM entity 26 with an ATM physical layer 28. The portions of host 6c designated by reference numbers 20–28 are typically implemented on a NIC or its associated software driver.

A link 30 connects physical layer 28 of host 6c in communicating relationship with a physical layer (port) of ATM switch 4c. Similarly, a link 32 connects switch 4c in communicating relationship with a port on ATM-LAN bridge 10b. The ATM "side" of bridge 10b includes layers 34, 36 and 38 which are comparable to layers 24, 26 and 28 of host 6c. The ATM "side" also includes a LEC 40, which is necessary to support LANE communications with host 6c. Among other functions, LEC 40 (as well as LEC 22) maintains a table or database, defined in LANE as a LE_ARP cache, which contains related pairs of ATM and MAC addresses that enable bridge 10b to properly forward frames between hosts 6c and 8b (or other hosts served by network 2). LEC 40 essentially marks the end of the ATM portion of network 2 and the beginning of a LAN portion. Thus, a bridge relay 42 provides communication between the ATM "side" and the LAN "side" of bridge 10b.

A (LAN) physical layer 44 is connected by a link 46 in communicating relationship with a LAN physical layer 48 of host 8b. A LAN MAC entity 50 provides communication between physical layer 48 and the higher layers of host 8b. Layer 48 and entity 50 are typically implemented on a NIC.

According to the requirements of LANE and LAN protocols, unique MAC addresses are associated with emulated MAC entity 20 and LAN MAC entity 50. When host 8b transmits a frame of information destined for host 6c, that frame (which includes the MAC address of MAC entity 50 as the source address and the MAC address of emulated MAC entity 20 as the destination address) is carried over link 46 to LEC 40. LEC 40 consults LE_ARP cache and determines the ATM address associated with the frame's destination address. If a virtual channel connection between LEC 40 and LEC 22 already exists, LEC 40 will use that connection to forward the frame toward host 6c. If not, LEC 40 will take steps to establish a virtual channel connection and then forward the frame.

Figure 3:
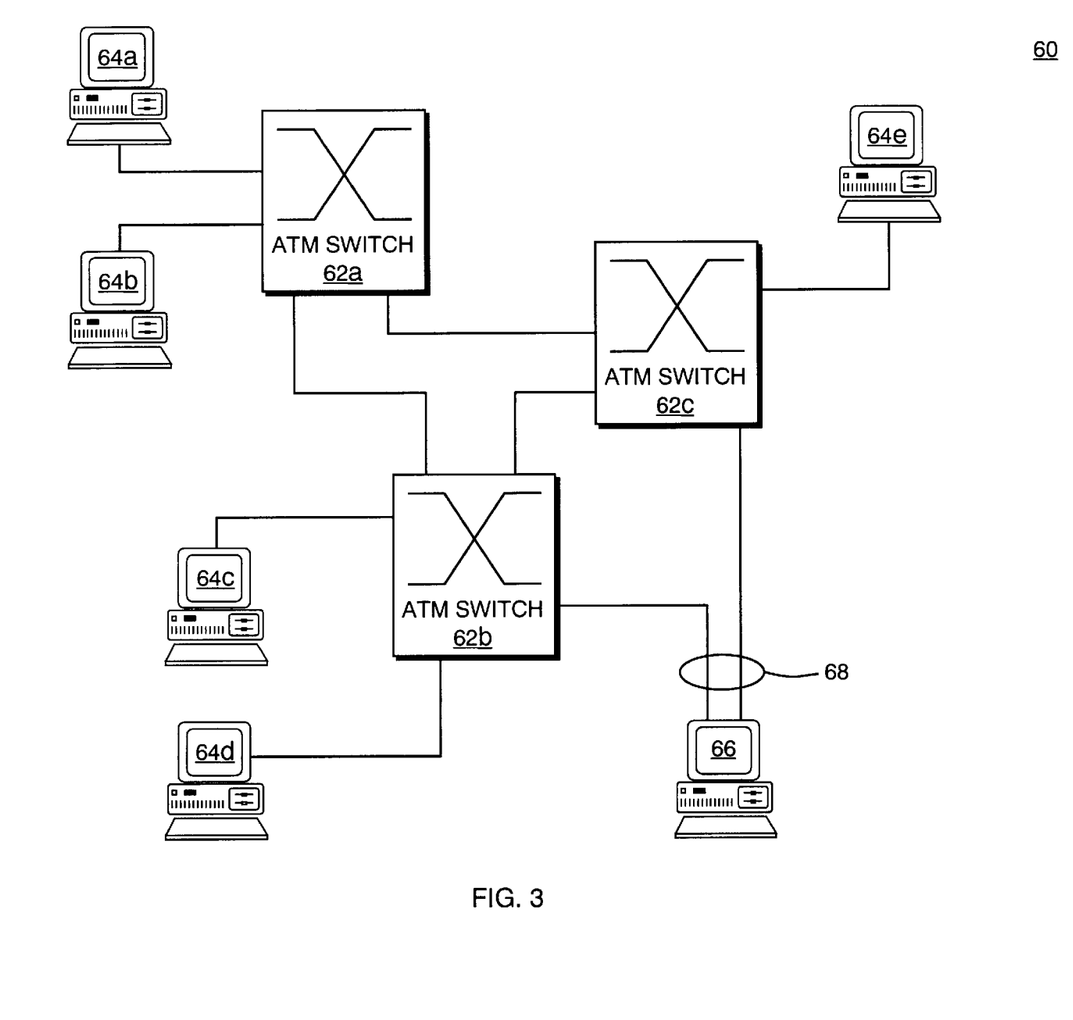
FIG. 3 is a block diagram of an ATM network which includes a host having a high availability, scaleable bandwidth, multiple port ATM network interface constructed in accordance with a preferred embodiment of the present invention.
Figure 4:
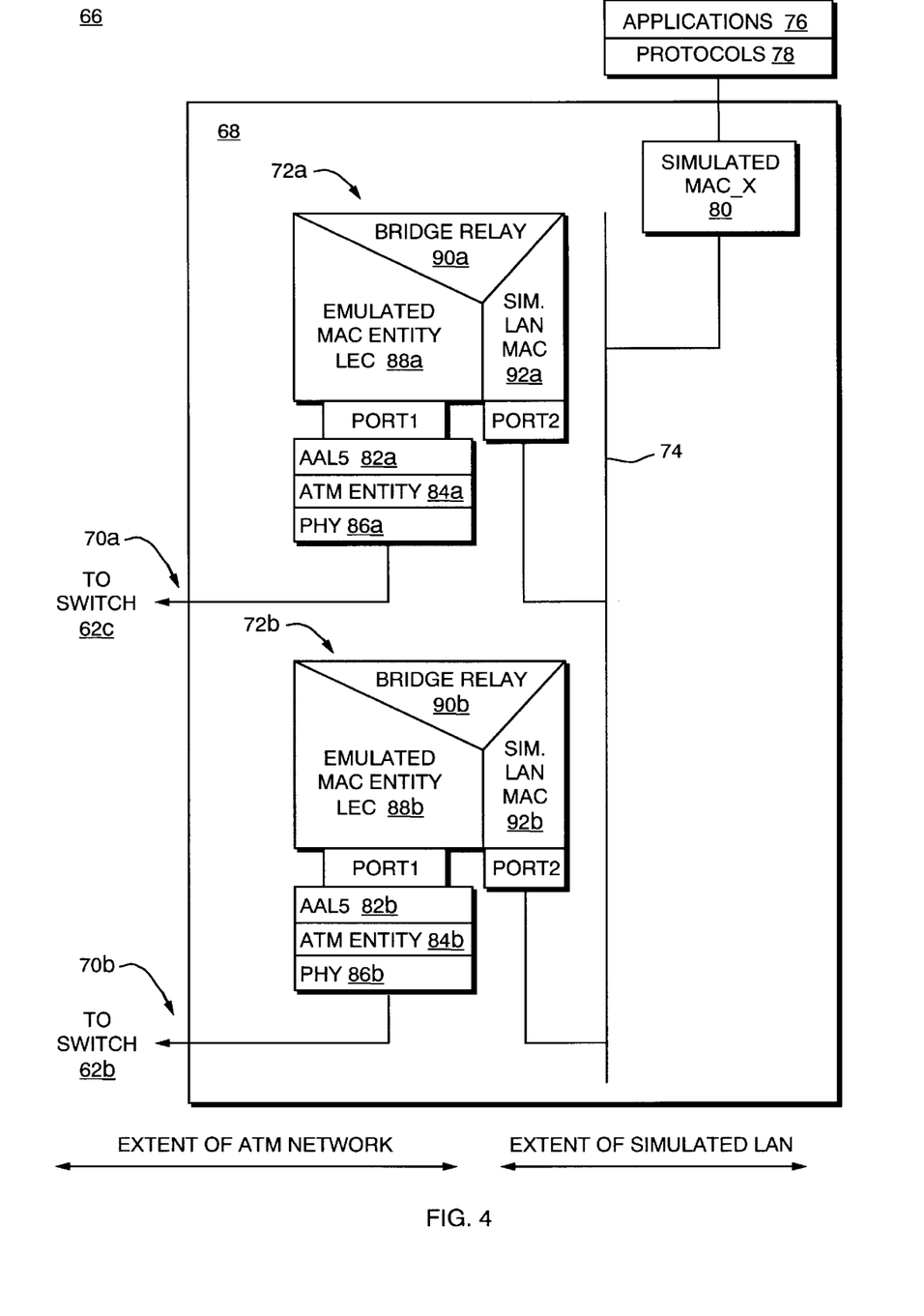
FIG. 4 is a block diagram of the interface of FIG. 3.

FIG. 3 depicts a network 60 which includes three ATM switches 62a–62c, five conventional hosts 64a–64e (each of which is connected to a single one of the ATM switches) and a host 66 which is connected by a high availability, scaleable bandwidth, multiport interface 68, in accordance with the present invention, with two ATM switches 62b and 62c. As shown in FIG. 4, interface 68 includes two NICs 72a and 72b which are connected, respectively, by links 70a and 70b with ATM switches 62c and 62b. NICs 72a and 72b are also connected in communicating relationship with a simulated MAC entity (MAC_X) 80 by a link or bus 74. MAC_X 80 communicates with higher application and protocol layers 76 and 78 of host 66.

NICs 72a and 72b are substantially identical, each having its own LEC (and associated LE_ARP cache) for communicating (using LANE as previously described) with the ATM switch to which it is connected. However, in accordance with a preferred embodiment of the present invention, a single, common MAC address (which, in effect, identifies MAC_X 80) is used to represent host 66. There are several advantageous results which arise from use of the single MAC address to represent host 66. First, frames destined for host 66 may be received by either of LECs 88a and 88b. Second, frames originating from host 66 may be transmitted through either of LECs 88a and 88b. Third, should increased bandwidth be desired, frames may be received or transmitted through both LECs without imposing any additional overhead on the ATM network. Fourth, should one of the LECs or NICs malfunction or fail, the other NIC may be transparently brought into service without adverse consequences to the ATM network and without requiring the network's LECs to update their LE_ARP caches because there is no change in the MAC address. Further, by connecting NICs 72a and 72b to different ATM switches as shown in FIG. 3, redundancy is effectively provided against failure of either one of those switches.

Figure 5A:
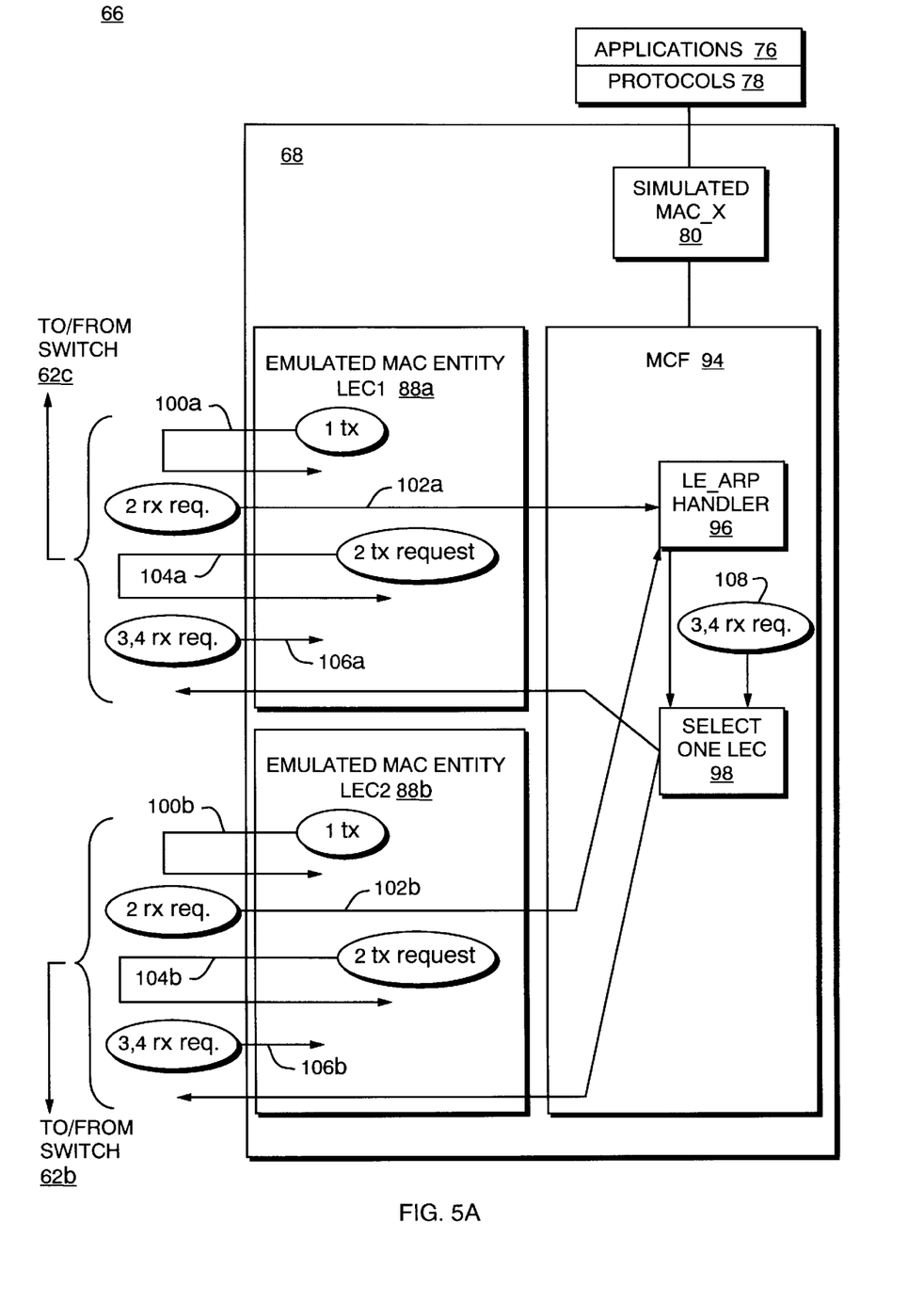
FIGS. 5A and 5B are diagrams showing the paths used by different types of communications conducted by the interface of FIG. 3.
Figure 5B:
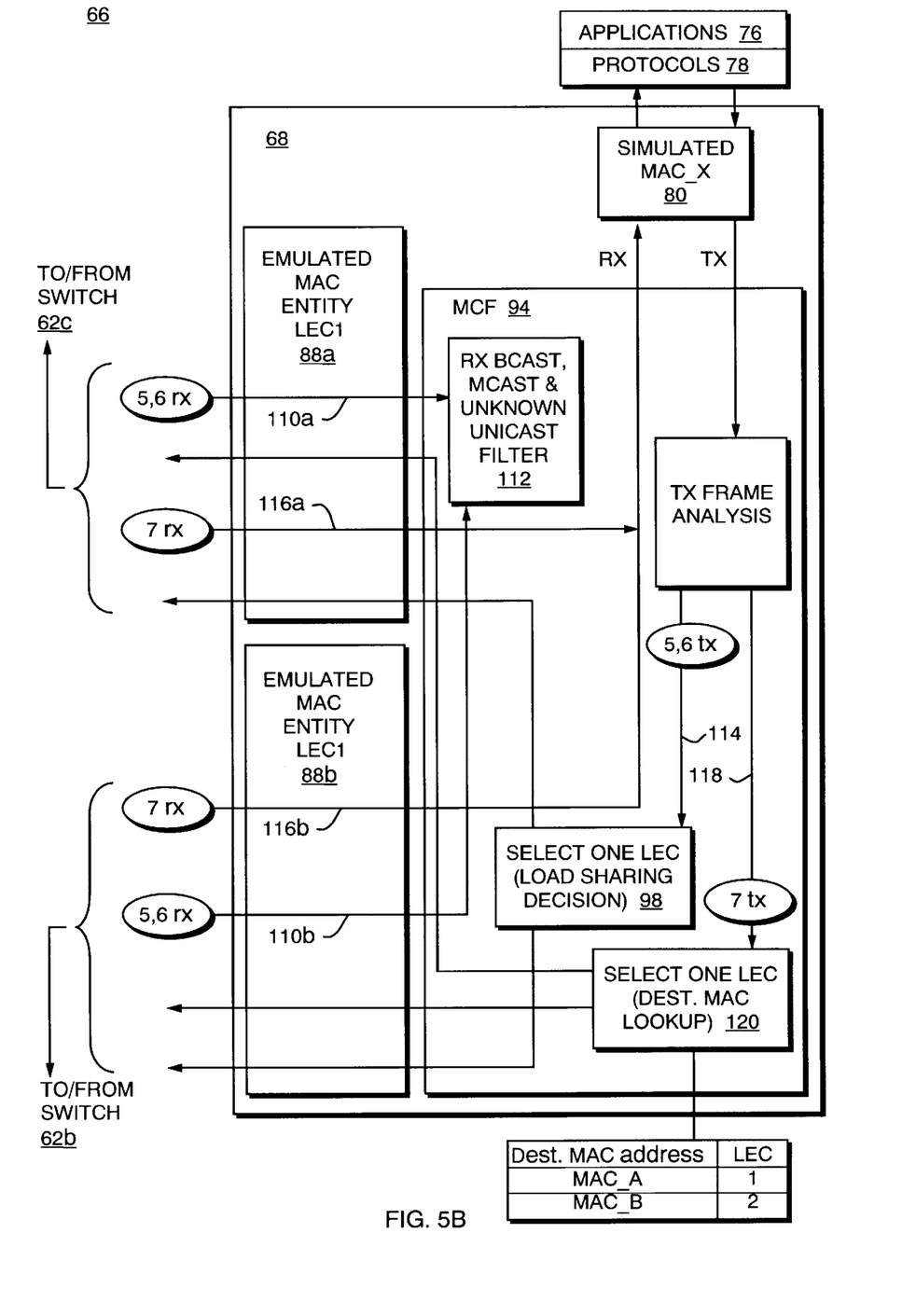

With reference now to FIGS. 5A and 5B, the functions of interface 68 will be described in detail. In flows 100a and 100b, each of LECs 88a and 88b is brought into an operational state in accordance with the LANE specification. Each of LECs 88a and 88b is configured, joins the emulated LAN and registers as a proxy (in the same sense that an ATM-LAN bridge registers as a proxy for whatever MAC addresses appear "behind" the bridge when viewed from the ATM network) for the single MAC address for MAC_X 80.

At flows 102a and 102b, address resolution is performed as LE_ARP requests (essentially, requests to associate a MAC address with an ATM address) are received from the ATM network (switches 62c and 62b) and passed to a multiport coordination function (MCF) 94 which includes a LE_ARP handler 96. MCF 94 includes a selector 98 which selects one of LECs 88a and 88b to respond to the LE_ARP requests. The ability of MCF 94 to select a particular LEC (in essence, to dynamically associate a particular LEC with the MAC address of MAC_X) enables effective load sharing between the LECs.

As indicated by flows 104a and 104b, each of LECs 88a and 88b generates a LE_ARP request once it has sent a unicast frame to an unknown destination via the ATM LAN broadcast. Because both LECs 88a and 88b receive all LE_ARP responses from the ATM network, they will associate such responses with their own outstanding requests, if any.

Flows 106a and 106b represent receipt of a LE_NARP (defined in LANE as a message to invalidate an address pair stored in the LE_ARP cache) or a LE_TOPOLOGY message (defined in LANE as a message to accelerate the aging of an address pair in which the MAC address is represented by a proxy). In the event that one of LECs 88a or 88b should malfunction or fail, host 66 would issue a LE_NARP or LE_TECHNOLOGY_CHANGE message using the remaining LEC as indicated at flow 108.

Flows 110a and 110b represent receipt of broadcast, multicast or unknown unicast frames from the ATM network. At 112, such frames are filtered such that only one copy of each frame is passed through to simulated MAC_X 80. For frames being transmitted by host 66 at flow 114, only one LEC is selected by selector 98 to transmit the frame in order to avoid duplication.

Flows 116a and 116b represent receipt of unicast frames carried on a data direct virtual channel connection. The receipt of such frames indicates that previous communication occurred which resulted in the establishment of the virtual channel connection. Thus, by definition, all such received frames are destined for host 66 and are forwarded by MCF 94 to simulated MAC_X 80. In the transmit path, represented by flow 118, the destination MAC address of a frame to be transmitted is examined and compared to the MAC-to-LEC mapping table maintained by MCF 94 in order to determine which of LECs 88*a* and 88*b* is part of the virtual channel connection. As shown in the example mapping table in the lower portion of FIG. 5B, if the destination MAC address is MAC_A, LEC 88*a* will be selected to transmit the frame.

It should be understood that MCF 94 may also be provided with appropriate logic for selecting a LEC for transmission of broadcast or multicast frames. For example, MCF 94 may simply select whichever LEC is operational and has the lowest logical identifier. Similarly, for the case of transmitting an unknown unicast frame, MCF 94 may select whichever LEC is operational and has the lower (or lowest, if more than two LECs are operational) number of existing data direct virtual channel connections. This approach would have the effect of balancing loads among all of the operational LECs.

It should be understood by those skilled in the art more than two NICs and associated LECs may incorporated in the present invention. It should also be understood that when the invention is implemented in a device such a router or bridge, the simulated MAC address (MAC_X 80) is simply replaced by an actual MAC address on the LAN side of the router or bridge. The inclusion of additional NICs and LECs provides even greater bandwidth between the host and the ATM network or additional levels of redundancy (or both) depending upon how such resources are used.

While the invention has been particularly shown and described with reference to preferred embodiments thereof, it will be understood by those skilled in the art that various changes in form and details may be made therein without departing from the spirit and scope of the invention. Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for providing local area network (LAN) emulated communication between an asynchronous transfer mode (ATM) network and a host, said apparatus comprising:

a plurality of network interface cards each of which has a port connected in communicating relationship with said ATM network, each of said cards having an associated LAN emulation client (LEC), and a single, common media access control (MAC) address assigned to said host; and a controller for directing communications between said LECs and a simulated MAC entity associated with said host, said controller operable to dynamically select one or more of said LECs for receiving frames from said ATM network, filtering frames received by said LECs so as to prevent duplicate frames from being passed to said simulated MAC entity, and causing frames received from said simulated MAC entity to be passed to one or more selected LECs for transmission to said ATM network.

2. The apparatus as in claim 1 wherein said controller is further operable to detect a failure or malfunction among said LECs and associated network interface cards and, in response thereto, to dynamically select another LEC and network interface card to functionally replace the failed or malfunctioning counterpart, thereby providing a level of redundancy with respect to host-ATM network communications.

3. The apparatus as in claim 1 wherein said controller is further operable to select multiple LECs and associated network interface cards for concurrently supporting host-ATM network communications, thereby scalably increasing available bandwidth for such communications.

4. The apparatus as in claim 3 wherein said controller is further operable to dynamically allocate communication loads among said LECs.

5. The apparatus as in claim 1 further comprising a database available to said controller, said database for storing updatable information for mapping a MAC destination address contained in a frame to be transmitted from said host to one of said LECs having a virtual channel connection established with the frame's destination.

6. The apparatus as in claim 1 wherein said ATM network may direct frames intended for said host to any of said LECs selected by said controller to receive frames.

7. The apparatus as in claim 1 wherein a failure or malfunction of any of said LECs or network interface cards is transparent to peers of said host.

8. A method of providing local area network (LAN) emulated communications between an asynchronous transfer mode (ATM) network and a host, said method comprising the steps of:

(1) providing a plurality of network interface cards each of which has a port connected in communicating relationship with said ATM network, each of said cards having an associated LAN emulation client (LEC), and a single, common media access control (MAC) address assigned to said host; and (2) providing a control function for directing communications between said LECs and a simulated MAC entity associated with said host, said control function for dynamically selecting one or more of said LECs for receiving frames from said ATM network, filtering frames received by said LECs so as to prevent duplicate frames from being passed to said simulated MAC entity, and causing frames received from said simulated MAC entity to be passed to one or more selected LECs for transmission to said ATM network.

9. The method as in claim 8 further comprising the step of detecting a failure or malfunction among said LECs and associated network interface cards and, in response thereto, dynamically selecting another LEC and network interface card to functionally replace the failed or malfunctioning counterpart, thereby providing a level of redundancy with respect to host-ATM network communications.

10. The method as in claim 8 further comprising the step of selecting multiple LECs and associated network interface cards for concurrently supporting host-ATM network communications, thereby scalably increasing available bandwidth for such communications.

11. The method as in claim 8 further comprising the step of dynamically allocating communication loads among said LECs.

12. The method as in claim 8 further comprising the step of providing a database available to said control function, said database for storing updatable information for mapping a MAC destination address contained in a frame to be transmitted from said host to one of said LECs having a virtual channel connection established with the frame's destination.

13. The method as in claim 8 further comprising the step of directing frames originating from said ATM network and intended for said host to any of said LECs selected by said control function to receive frames.

14. The method as in claim 8 wherein a failure or malfunction of any of said LECs or network interface cards is transparent to peers of said host.

15. Apparatus for providing local area network (LAN) emulated communication between an asynchronous transfer mode (ATM) network and a device which communicates with said network using LAN emulation over ATM (LANE), said apparatus comprising:

a plurality of network interface cards each of which has a port connected in communicating relationship with said ATM network, each of said cards having an associated LAN emulation client (LEC), and a single, common media access control (MAC) address assigned to said device; and a controller for directing communications between said LECs and a simulated MAC entity associated with said device, said controller operable to dynamically select one or more of said LECs for receiving frames from said ATM network, filtering frames received by said LECs so as to prevent duplicate frames from being passed to said simulated MAC entity, and causing frames received from said simulated MAC entity to be passed to one or more selected LECs for transmission to said ATM network.

* * * * *